United States Patent
Alexander et al.

(10) Patent No.: US 10,070,402 B2
(45) Date of Patent: Sep. 4, 2018

(54) ADAPTIVE, PREDICTIVE SYNCHRONIZATION FOR REDUCING CONNECTION ESTABLISHMENT DELAYS IN AD-HOC FREQUENCY HOPPING SPREAD SPECTRUM NETWORKS

(71) Applicant: COOPER TECHNOLOGIES COMPANY, Houston, TX (US)

(72) Inventors: Roger Kirk Alexander, Rockville, MD (US); Sergey Sukhobok, Rockville, MD (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 288 days.

(21) Appl. No.: 14/867,812

(22) Filed: Sep. 28, 2015

(65) Prior Publication Data

US 2016/0165557 A1   Jun. 9, 2016

Related U.S. Application Data

(60) Provisional application No. 62/088,857, filed on Dec. 8, 2014.

(51) Int. Cl.
| | |
|---|---|
| *H04B 1/7156* | (2011.01) |
| *H04W 56/00* | (2009.01) |
| *H04W 84/18* | (2009.01) |

(52) U.S. Cl.
CPC ........ *H04W 56/001* (2013.01); *H04B 1/7156* (2013.01); *H04B 2001/71563* (2013.01); *H04W 84/18* (2013.01)

(58) Field of Classification Search
CPC ................................................ H04W 56/001
See application file for complete search history.

(56) References Cited

U.S. PATENT DOCUMENTS

| | | |
|---|---|---|
| 6,731,669 B1 | 5/2004 | Kudoh et al. |
| 7,245,649 B2 | 7/2007 | Haartsen |

(Continued)

FOREIGN PATENT DOCUMENTS

| | | |
|---|---|---|
| CN | 103634881 A | 3/2014 |
| WO | 87/02206 A1 | 4/1987 |
| WO | 2007/036847 A1 | 4/2007 |

OTHER PUBLICATIONS

European Patent Office, "International Search Report and Written Opinion" (from corresponding PCT/US2015/054363), dated Jan. 5, 2016, 11 pp.

*Primary Examiner* — Kent Krueger
(74) *Attorney, Agent, or Firm* — Eckert Seamans

(57) ABSTRACT

Systems and methods for performing predictive frequency searches in ad-hoc multi-hop wireless networks is described herein. In one exemplary embodiment, a predicted frequency is selected and a synchronization request is sent from an initiating node to a target node on the predicted frequency. If the transmitted synchronization request is the last synchronization request for the predictive frequency search mode sequence, then the initiating node enters into a receiving mode to receive a synchronization response message from the target node. If not, the initiating node selects a new predicted frequency, and sends a new synchronization request to the target node on that frequency. This repeats until the transmitted synchronization request is the last predictive synchronization request, and the initiating node enters into the receiving mode. The initiating node in the selection of synchronization request transmission frequencies can adaptively alternate between predictive and full spectrum frequency searches.

14 Claims, 5 Drawing Sheets

(56) References Cited

U.S. PATENT DOCUMENTS

| | | |
|---|---|---|
| 8,228,826 B2 | 7/2012 | Boerger et al. |
| 8,565,145 B2 | 10/2013 | Khan et al. |
| 2003/0092386 A1 | 5/2003 | Miklos et al. |
| 2012/0281730 A1 | 11/2012 | Hulvey |

ADAPTIVE, PREDICTIVE SYNCHRONIZATION FOR REDUCING CONNECTION ESTABLISHMENT DELAYS IN AD-HOC FREQUENCY HOPPING SPREAD SPECTRUM NETWORKS

CROSS-REFERENCE TO RELATED APPLICATION

The instant application claims priority from U.S. Provisional Patent Application Ser. No. 62/088,857, filed Dec. 8, 2014, the disclosures of which are incorporated herein by reference.

BACKGROUND OF THE INVENTION

1. Field of the Invention

The present invention generally relates to systems and methods for reducing connection establishment delays in ad-hoc frequency hopping spread spectrum networks. In particular, adaptive and predictive synchronization techniques are employed to reduce delay times and minimize potential interference.

2. Description of the Related Art

An ad-hoc wireless multi-hop communications network, such as a mesh network, allow sets of nodes to exchange communications with one another over a wireless medium using, for example, radio frequency (RF) communication. Such nodes often are minimal in design, and direct connection to a server via a gateway (e.g., a network), can be difficult. For example, each node may be a communications device, or the communications function of the node may be a secondary or ancillary function. By connecting with neighboring nodes instead of forming direct links to the gateway or server, individual nodes, such as sensors or computer systems, are capable of routing communications to an intended destination (e.g., a gateway) more effectively. This technique can be especially useful for nodes deployed in remote geographic areas or regions where high data traffic across certain frequency regimes is possible.

While the number of nodes in an ad-hoc multi-hop network is not limited, often the particular path from an originating node to its destination is defined by certain criteria such as link quality and bandwidth. Each node in the ad-hoc multi-hop network is capable of transmitting communications, receiving communications, and/or relaying communications between other nodes in the network and/or the gateway. Furthermore, each node is capable of broadcasting information to neighboring nodes regarding its distance and radio signal strength to the gateway. A node attempting to connect to the gateway using one or more neighboring nodes may assess the "cost" associated with each neighboring node, and thus determine which path is least expensive. For example, the quality of the link between a node and a neighboring node, as well as the bandwidth of the link, may be determined to see how quickly the data will be sent. The higher the quality of the link and bandwidth, the lower the cost associated with sending data through that node may be. In some embodiments, each node in the network connected with the gateway and/or the gateway itself may maintain a map of the best path or paths for sending and/or receiving data to the gateway as well as to other nodes in the network.

Nodes can establish connections and transmit data with neighboring nodes on one or more frequency channels. It is impractical for a receiving node to be idle on one frequency channel, or for a transmitting node to transmit on a single frequency channel for a long period of time as this would create a noisy frequency channel. Furthermore, if a receiving node and/or transmitting node only receives/transmits communications on one particular frequency channel, that channel would be unavailable to other nodes attempting to also communicate with either the receiving or transmitting nodes, or another node in the network, or another node in a different, neighboring network, using the same frequency regime. Additionally, in some environments, one or more frequencies may be temporarily or permanently interfered with due to radio frequency activity external to the system of communicating nodes. Regulatory operating requirements may also dictate the maximum duration that a given communications device is permitted to transmit on a single frequency within a defined time period. As a result of interference concerns or regulation requirements, it is beneficial for communications to be performed by dynamically changing the frequency channels used to transmit and receive data.

One way to apply dynamic frequency changes is to not have large continuous data communications transferred on a single frequency channel, and instead breaking up the large communications or data into multiple small communications or small data packets or frames, and transmit those smaller packets or frame across multiple frequencies. This process is typically referred to as a frequency hopping spread spectrum ("FHSS") system, and is extremely useful for reducing noise or interface on a particular frequency channel. Nodes, once connected with one another, can "hop" across the various frequency channels in the frequency spectrum together using FHSS principles, thereby reducing the amount of time spent on any particular frequency channel and minimizing the amount of noise or bandwidth used on that particular frequency channel.

However, using FHSS systems is difficult if a transmitting node does not know beforehand what frequency channel a receiving node is currently on. If this information is known, the two nodes can "hop" across various frequency channels together. If this information is not known, the transmitting node has to determine what frequency channel the receiving node is on, as well as the amount of time the receiving node spends on each frequency channel. The frequency channel that the receiving node is on at time $t_1$, for example, may not be the same frequency channel that the receiving node is on at time $t_2$.

One way that the transmitting node can determine the receiving node's current frequency channel is by sending a synchronization request to the receiving node on every frequency channel. The synchronization request is typically a small data packet, which, if the receiving node is on a particular frequency channel that the synchronization request has been sent on, the transmitting node will receive a synchronization response message back from the receiving node. However, sending synchronization requests on every frequency channel is inefficient for finding the particular frequency channel the receiving node is currently located on, and also introduces unnecessary, and unwanted, noise into the frequency spectrum.

Another way that the transmitting mode can determine the receiving mode's current frequency channel is by sending a synchronization request to the receiving node on one frequency channel, and then waiting for the receiving node to send a synchronization response message back when the receiving node is on that particular frequency channel that the synchronization request was sent on. While this approach minimizes the amount of extraneous noise introduced into the frequency spectrum, it is a slow and cumbersome process. There may be many frequency channels and it may take a long, and impractical, amount of time to wait for the receiving node to eventually hop to the frequency channel that the synchronization request has been sent on. Furthermore, the transmitting node will also be required to remain on the specific frequency channel that the synchronization request was sent on while waiting for the receiving node to send a synchronization response message back. Even if the synchronization request is of short duration, the selected frequency may be temporarily or permanently interfered with by external system activity that may preclude the successful transmission and/or reception on that particular frequency channel.

Thus, it would be beneficial for there to be systems and methods that allow for a transmitting node to intelligently predict what frequency channel a corresponding receiving node will be on within a frequency spectrum so that the two nodes can more quickly and efficiently synchronize with one another for frequency hopping together within an ad-hoc multi-hop wireless communications network.

SUMMARY OF THE INVENTION

Accordingly, it is an objective of this invention to provide a method for performing a predictive frequency search in an ad-hoc multi-hop wireless network. In one exemplary embodiment, an initiating node enters into a predictive frequency search mode. The initiating node selects a predicted frequency from a plurality of predicted frequencies for sending a synchronization request on to a target node. The synchronization request is transmitted from the initiating node to the target node on the selected predicted frequency. A determination is then made, in one embodiment, as to whether the transmitted synchronization request is the last synchronization request to be sent from the initiating node to the target node in the predictive frequency search mode. If the transmitted synchronization request is not the last synchronization request, then the selecting, transmitting, and determining are all repeated using a new predicted frequency until the transmitted synchronization is the last synchronization request of the predictive search.

In another exemplary embodiment, an initiating node operating within an ad-hoc multi-hop wireless network, where the ad-hoc multi-hop wireless network includes the initiating node, at least one target node, and a gateway, includes a radio, an interface, storage, and at least one processor. The radio is operable to send and receive communications from at least one of the at least one target nodes and the gateway. The interface is operable to receive the communications from the radio and from a data source. The storage is operable to store the received communications and/or the synchronization information corresponding to the one or more target nodes and the gateway. The at least one processor is operable to, amongst other features, send a plurality of synchronization requests to the target node on a plurality of predicted frequencies in a predictive frequency mode and send a plurality of synchronization requests to the target node on a plurality of full search frequencies in a full search mode. The at least one processor is also operable to enter into a receiving mode for receiving a synchronization response message from the target node in response to one of the plurality of synchronization requests sent to the target node, and synchronize, in response to receiving the synchronization response message from the target node, the initiating node with the target node such that the initiating node and the target node are operable to frequency hop with one another.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF EXEMPLARY EMBODIMENTS

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, as used herein, the singular form of "a", "an", and "the" include plural references unless the context clearly dictates otherwise. Still further, as used herein, a "transmitting" node or an "initiating" node refer to any node that sent communications originate from, and a "receiving" node or a "target" node refer to a node that communications are directed to. Additionally, as used herein, the terms "frequency" and "frequency channel" refer to frequencies within a frequency spectrum that a node may send and/or receive communications on.

A multi-hop network is one where nodes transmit data or communications to one another, including, where necessary, through intermediate nodes that can act as routing devices for purposes of relaying data or communications towards their final destination. The destination may be an endpoint node on the local network, or a gateway that provides a connection between the local network and another network or server. A well-known example of a multi-hop network is a radio frequency (RF) mesh network topology. Embodiments of the invention may be used in a variety of applications involving data communications. One such application is in energy metering, such as an RF mesh advanced metering infrastructure (AMI) network that provides utilities with a single integrated-mesh network for electric, water and gas data communications with the ability to support multiple meter vendors and multiple utility application services including, but not limited to, demand response (DR), and/or distribution automation (DA). However, persons of ordinary skill in the art will recognize that the present invention is applicable in a variety of different fields, and energy metering is merely one such example.

Figure 1:
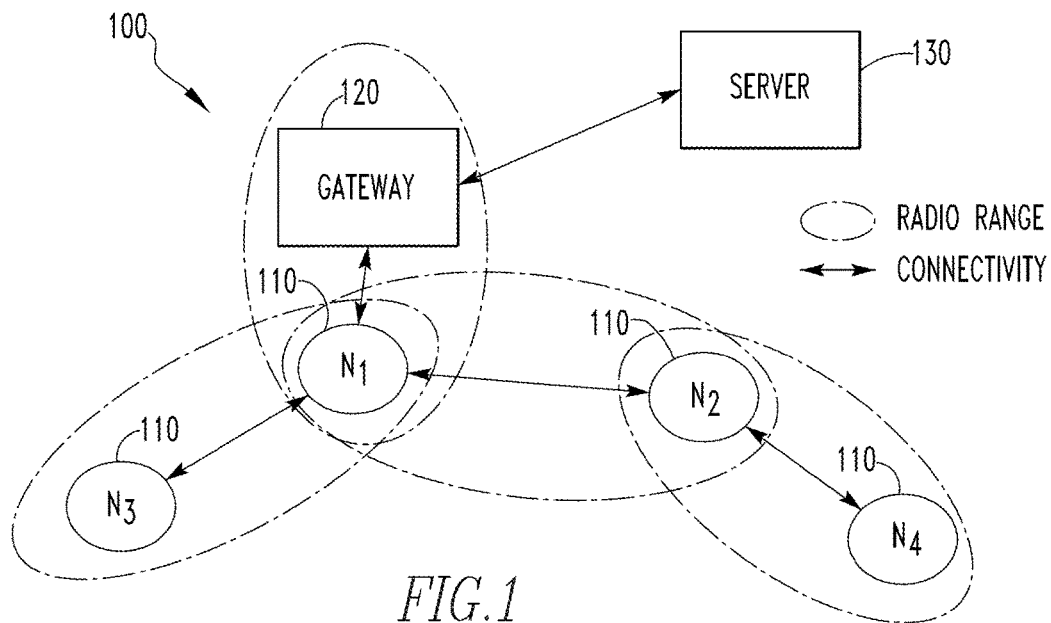
FIG. 1 is a schematic illustration of an ad-hoc multi-hop wireless network in accordance with various embodiments.

FIG. 1 is an illustrative diagram of an exemplary wireless multi-hop network in accordance with various embodiments. A wireless multi-hop network 100 includes, in the non-limiting illustrated embodiment, one or more of a node 110, such as nodes 110 $N_1$-$N_4$, which may act as sources and/or destinations of data to be communicated. In one embodiment, one or more of nodes 110 may act as potential relays of data to be forwarded to a destination. Wireless multi-hop network 100 also includes, in the illustrated embodiment, gateway 120, which facilitates the communicated data from nodes 110 to a server 130. Gateway 120 may also provide a connection between wireless multi-hop network 100 and another network, such as another wireless multi-hop network substantially similar to network 100.

In one embodiment, the dotted lines represent radio ranges for nodes 110, and can each be considered as a local neighborhood for the associated node 110. Those node devices 110 that are within radio range of one another are referred to herein as neighboring nodes or neighbors. For example, nodes 110 $N_1$ and 110 $N_2$ are neighbors of one another and are within communications range of one other. Similarly, node 110 $N_1$ and gateway 120 are within radio range of one another. Thus, in one embodiment, node $N_2$ communicates with server 130, and thus gateway 120, via node 110 $N_1$ acting as an intermediary node.

In some data collection systems, such as AMI systems, although data may be sent from any node 110 to any other node 110, and although commands can be sent down from gateway 120 to one or more of nodes 110, the majority of the data flow is between nodes 110 and gateway 120. Neighboring nodes 110 may, therefore, be viewed hierarchically relative to gateway 120. Intermediary nodes 110, through which data or communications must pass through in order to reach gateway 120, can be viewed, in one exemplary embodiment, as parent nodes, whereas downstream nodes may be referred to as child nodes. That is, along the multi-hop communications path between nodes 110 and gateway 120, a neighbor node 110 that is 'closer' (along the formed routing path) to gateway 120 will be referred to as a 'parent' node to the connected neighboring node that is (one hop) farther away. For example, node 110 $N_1$ may be referred to as a parent node and node 110 $N_3$ may be referred to as a child node, as communication to and/or from node $N_3$ must hop across node $N_1$ to reach gateway 120.

In the illustrated embodiment, node 110 $N_1$ is limited such that it is the only node that can create a direct link to gateway 120, however this is merely exemplary and any other node 110 $N_2$-$N_4$ may additionally, or instead, form a direct link to gateway 120. In the illustrated embodiment, nodes 110 $N_2$ and $N_3$ are children of parent node $N_1$. Similarly, node 110 $N_4$ is a child of node 110 $N_2$ (and a descendant of node 110 $N_1$). Node 110 $N_4$ can thus have messages routed across nodes 110 $N_2$ and 110 $N_1$ to gateway 120 in order to communicate with gateway 120 and/or server 130 (or even node 110 $N_3$).

Figure 2:
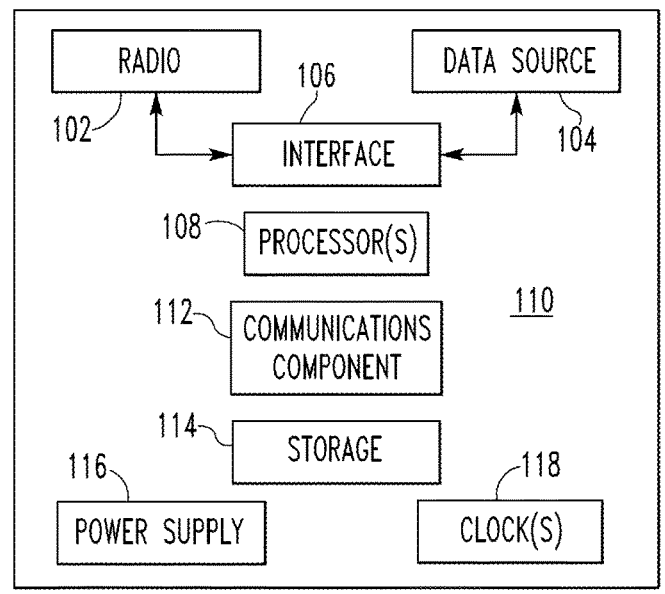
FIG. 2 is a schematic illustration of a node from the ad-hoc multi-hop wireless network of FIG. 1, in accordance with various embodiments.

FIG. 2 is an illustrative block diagram of node 110 from ad-hoc multi-hop wireless network 100 of FIG. 1 in accordance with various embodiments. Persons of ordinary skill in the art will recognize that node 110 is merely one example of a node that may be implemented within the ad-hoc multi-hop wireless network system, and it is not limited to being only one part of the system.

In the illustrated non-limiting embodiment, node 110 includes a radio 102, a data source 104, an interface 106, a processor or processors 108, a communications component 112, a storage 114, a power supply 116, and a clock or clocks 118. One or more of the previously mentioned components may be omitted or combined, and/or one or more additional components may be added. For example, node 110 may include a bus connector. As another example, node 110 may include multiple instances of one or more of the components included therein, however for simplicity, only one of each component has been shown. For example, multiple storages 114 may be included within node 110, and each storage may have a different or similar function.

Radio 102, in one embodiment, includes a transmitter and a receiver element which can operate alternatively or simultaneously. Radio 102 also includes, in an exemplary embodiment, an FHSS radio module and/or a direct-sequence spread spectrum (DSSS) module. Data source 104, in one embodiment, is served by radio 102 and provides a variety of functions for node 110. For example, data source 104 may be an application processor that interfaces with a utility meter or sensor, or data source 104 may be a utility meter or sensor itself. As another example, data source 104 may be an instrument, actuator, and/or a computer system, however these are merely illustrative examples.

Interface 106, in one embodiment, facilitates inputs and outputs of applications and controls data between radio 102 and data source 104. Interface 106 may include digital to analog (D/A) and/or analog to digital (A/D) circuitry. Interface 106 may also include bus circuitry, one or more serial ports (e.g., a USB port), a parallel portion, or any other port or circuitry, or any combination thereof.

Processor(s) 108 includes any processing circuitry, such as one or more processors capable of controlling operations and functionality of node 110. In one embodiment, processor(s) 108 facilitates communications between various components within node 110. For example, processor 108 may oversee and coordinate functionality of radio 102 and/or control the operation of data source 104. Processor 108, in one exemplary embodiment, runs an operating system of node 110, applications resident on node 110, firmware applications, media applications, software resident on node 110, or any other type of application, or any combination thereof. In one embodiment, processor(s) 108 detects inputs and/or relates detected inputs to one or more actions to be performed on or by node 110. For example, processor 108, in one embodiment, communicates with interface 106 such that inputs to interface 106 are recognized and processed accordingly.

Communications component 112 includes any circuitry capable of connecting to a communications network, such as gateway 120, and/or transmitting communications (e.g., voice or data) to one or more nodes (e.g., nodes 110) and/or servers (e.g., server 130). Communications component 112 communicates using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Storage 114 includes one or more storage mediums. Various types of storage mediums include, but are not limited to, hard-drives, solid state drives, flash memory, permanent memory (e.g., ROM), or any other storage type, or any combination thereof. Any form of data, such as photographs, music, files, videos, applications, and/or documents, is capable of being stored within storage 114. Storage 114, in one embodiment, also corresponds to memory. For example, storage 114 may include cache memory, semi-permanent memory (e.g., RAM), or any other type of memory. In one embodiment, a separate memory component, or separate memory components, are included within node 110.

Power supply 116 provides electrical power for some or all of the components of node 110. Each component, however, may have a different power requirement and power supply 116 is capable of providing an appropriate power supply to each component. Power supply 116 includes, but is not limited to, a battery, power capture circuitry (e.g., a photovoltaic cell), and/or an electrical generator circuit. In one embodiment, power supply 116 facilitates power supply from an external source such as an AC main source, and supplies the power from the external source to the appropriate components within node 110.

Clock(s) 118, in one embodiment, include any form of digital and/or analog clock. Clock(s) 118 are capable of synchronizing with an overall master clock, such as a clock corresponding to server 130, however, clock(s) 118 may be programmed individually. In one embodiment, clock(s) 118 include one or more timers or counters that measure a temporal difference between clock(s) 118 of node 110 and another clock located on a separate node. Clock(s) 118 are capable of being precise to the minute, second, millisecond, or nano-second, or any other temporal unit such that differences between clock(s) 118 of node 110 and another clock on a separate node is capable of being determined.

In order to pass information from one node to another node, each transmitting and receiving node 110, in one embodiment, will reside on a same frequency or frequency channel. However, sending large data packets or files over one frequency channel is difficult as it may be more susceptible to interference on a single frequency channel within ad-hoc multi-hop wireless network 100. Furthermore, some frequency channels may be slower or less robust than others, and the process of communicating data between nodes on a particular channel may be unnecessarily slow. Typically, large files or large amounts of data are broken up into smaller data pieces and sent on different frequencies. Each node 110 is then capable of hopping across different frequencies over time so that the data can be sent across the various frequency channels. The difficulty, however, is that when attempting to connect to a neighboring node, a transmitting node may not know which frequency the neighboring node they are trying to connect with is currently residing on.

Further complicating matters is the fact that the neighboring node (and even the initiating node), while frequency hopping, does not idle on one frequency channel for an extended period of time, and instead moves across many frequency channels. Nodes idling on one frequency may be subject to communications difficulties from intended or unintended signal interference or from other systems or networks which operate using that frequency. For example, some geographic regions may have certain portions of the frequency spectrum occupied. For example, up to 4 MHz frequency communications may be used by certain broadcasting systems in a specific geographic region. Thus, a node idling on a frequency within the 4 MHz regime will experience difficulties while attempting to send and/or receive communications from other nodes, and/or disrupt the broadcasting system. As another example, if a wireless telephone handset communicates with its base at a frequency $f_1$, a node within the premise sitting on frequency $f_1$ to receive data may be interfered with and precluded from communicating for the entire duration a telephone conversation occurring using the wireless telephone handset and base.

A simple solution would be to send out communications on every frequency within the frequency spectrum. While this approach would statistically provide a transmitting node with a very high probability of finding the frequency a receiving node is currently residing on, it will also introduce a large amount of extraneous noise into the frequency spectrum on the other frequency channels.

In one embodiment, a transmitting node, such as node 110 $N_1$, will attempt to send a small packet on a particular frequency channel to a receiving node, such as node 110 $N_2$, to see if the receiving node is on that frequency channel. The small packet, in one embodiment, is a synchronization request, or SYNC request. This process allows the transmitting node to keep communications on each frequency channel brief, and minimizes the amount of extraneous noise introduced into the frequency spectrum.

Figure 3A:
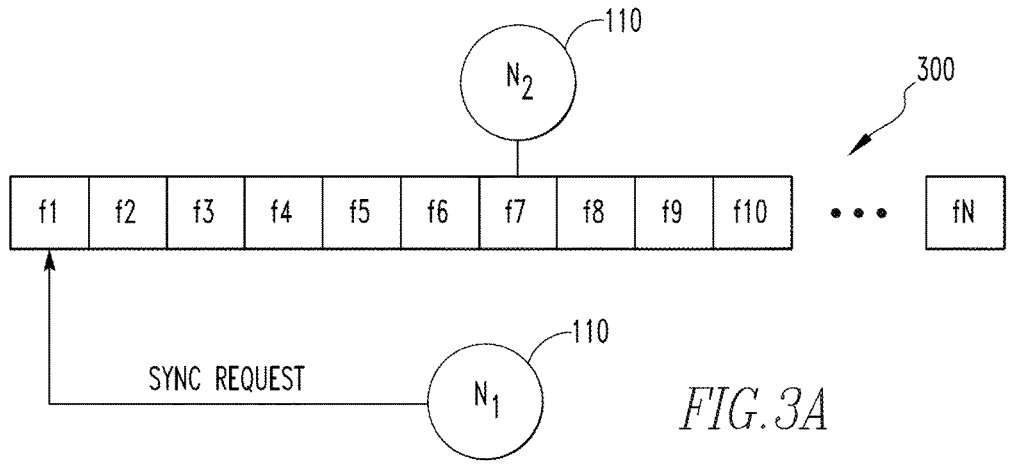
FIGS. 3A-C are schematic illustrations of an initiating node sending synchronization requests to a target node on various frequency channels in a predictive search mode in accordance with various embodiments.
Figure 3B:
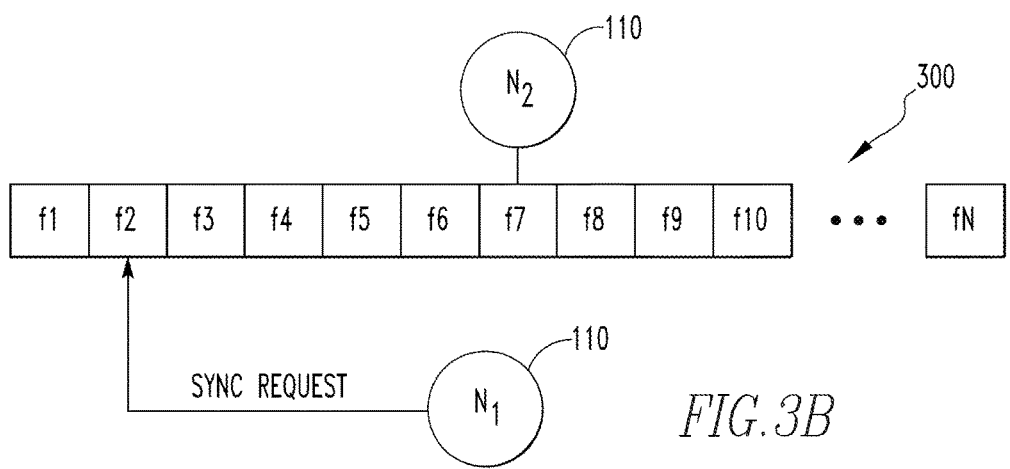
Figure 3C:
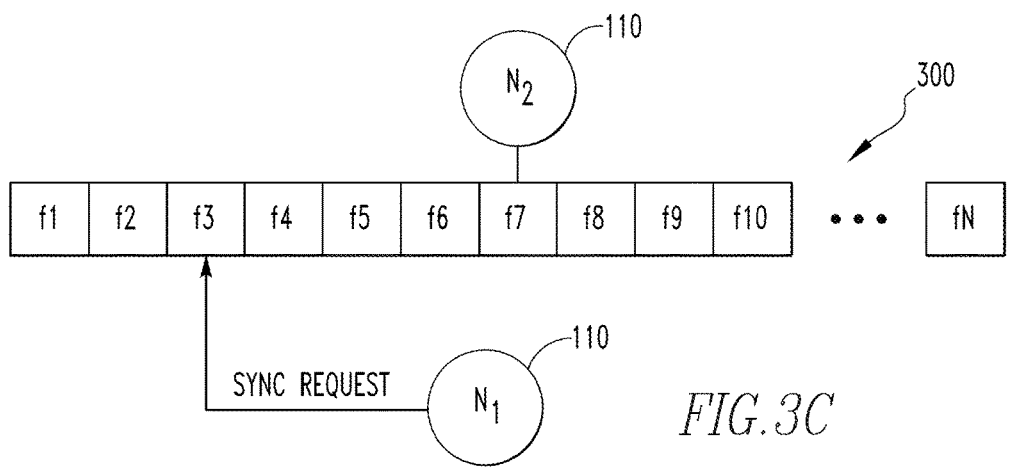

FIGS. 3A-C are illustrative diagrams of transmitting node 110 $N_1$ attempting to transmit data to receiving node 110 $N_2$ in an ad-hoc multi-hop wireless network. In the illustrated embodiment of FIG. 3A, node 110 $N_1$ is attempting to send a synchronization request, or SYNC request, to receiving node 110 $N_2$ on a frequency $f_1$ within a frequency spectrum 300. Frequency spectrum 300 includes any number of suitable frequencies at any suitable frequency interval. In the exemplary illustrated embodiment, frequency spectrum 300 includes frequencies $f_1$, $f_2$, $f_3$, $f_4$, . . . $f_N$. For example, if frequency spectrum 300 includes fifty (50) frequency channels, $f_N$ may correspond to $f_{50}$, and each frequency $f_1$-$f_{50}$ may correspond to one frequency channel of the fifty frequency channels.

Although transmitting node 110 $N_1$ is attempting to send the SYNC request on frequency $f_1$ to receiving node 110 $N_2$, node 110 $N_2$, in the illustrated embodiment, is not currently residing on frequency $f_1$, and instead is currently on frequency $f_7$. In response to sending communications along a channel where node 110 $N_2$ is not found, a response to the SYNC request, and thus synchronization of nodes $N_1$ and $N_2$, will not occur. Furthermore, as shown in FIG. 3B, node 110 $N_1$ will move to the next suitable frequency channel, $f_2$, and to attempt to send the SYNC request again to receiving node 110 $N_2$. However, at this point in time, receiving node 110 $N_2$, which previously was found on frequency channel $f_7$, is now found on frequency channel $f_{10}$. This process of sending out SYNC requests on various channels continues, in one embodiment, until the frequency channel that node 110 $N_1$ sends the SYNC request out on is the same as the frequency channel that node 110 $N_2$ currently resides on. For example, as shown in FIG. 3C, node 110 $N_1$ sends the SYNC request out on frequency channel $f_3$. Receiving node 110 $N_2$, in the illustrated embodiment, is also currently on frequency channel $f_3$ and therefore, a response to the SYNC request can be sent from receiving node 110 $N_2$ to transmitting node 110 $N_2$ informing node 110 $N_1$ of various characteristics for receiving node 110 $N_2$ that will allow the two nodes to synchronize and frequency hop together.

After receiving a response to the SYNC request from receiving node 110 $N_2$, node 110 $N_1$ and node 110 $N_2$ are capable of synchronizing with one another. As shown in the non-limiting embodiment of FIG. 3D, node 110 $N_1$ sends a SYNC request 302 to node 110 $N_2$ on frequency channel $f_3$. SYNC request 302, in one embodiment, includes various operating conditions of node 110 $N_1$ such as an internal time $t_{N_1}$, a frequency position $x_{N_1}$, and/or a frequency hopping velocity $v_{N_1}$. Internal time $t_{N_1}$ includes information corresponding to internal clock 118 of node 110 $N_1$. For example, each node from network 100 may have a different internal time defined by their internal clock, and each time may not be synchronized with the other nodes. Internal time $t_{N_1}$ sent to node 110 $N_2$ informs node 110 $N_2$ of the internal time of transmitting node 110 $N_1$. In one embodiment, frequency position $x_{N_1}$ informs node 110 $N_2$ which frequency position in a defined cycle that node 110 $N_1$ is on when it transmits SYNC request 302 to node 110 $N_2$. For example, node 110 $N_1$ may be on frequency channel $f_3$ when SYNC request 302 is sent. However, persons of ordinary skill in the art will recognize that by transmitting SYNC request 302, node 110 $N_2$ will know frequency position $x_{N_1}$ of node 110 $N_1$, and the transmission of frequency position $x_{N_1}$ may not occur, or may occur for redundancy purposes. Frequency hopping velocity $v_{N_1}$ informs receiving node 110 $N_2$ of how fast node 110 $N_1$ is hopping from frequency to frequency. Thus, with some or all of the information provided within SYNC request 302, node 110 $N_2$ would be able to determine what frequency channel node 110 $N_1$ would be on at some future time.

After transmitting node 110 $N_1$ sends SYNC request 302 to node 110 $N_2$, node 110 $N_1$ waits for a certain period of time to see if a SYNC response 304 is sent back. If SYNC response 304 is sent, this means that node 110 $N_2$ is indeed on the frequency channel that node 110 $N_1$ predicted and synchronization between the two nodes can occur. SYNC response 304 includes, in one embodiment, various operating conditions associated with node 110 $N_2$. For example, SYNC response 304, in one embodiment, includes various operating conditions of node 110 $N_2$ such as an internal time $t_{N_2}$, a frequency position $x_{N_2}$, and/or a frequency hopping velocity $v_{N_2}$ of node 110 $N_2$, which may be similar to internal time $t_{N_1}$, a frequency position $x_{N_1}$, and/or a frequency hopping velocity $v_{N_1}$ of node 110 $N_1$ except they will correspond to an internal time, a current frequency position, and a frequency hopping velocity for node 110 $N_2$.

Figure 3D:
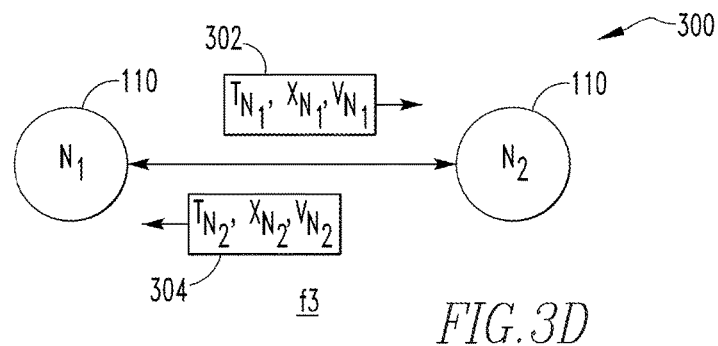
FIG. 3D is a schematic illustration of the initiating node and the target node of FIGS. 3A-C synchronizing with one another in accordance with various embodiments.

Persons of ordinary skill in the art will recognize that although SYNC request 302 and SYNC response 304 include an internal time, a frequency position, and a frequency hopping velocity for a corresponding node, one or more additional operating conditions for each node may be included within either of SYNC request 302 and/or SYNC response 304. Furthermore, one or more of the internal time, frequency position, and frequency hopping velocity for each node may not be included in either of the SYNC request 302 and/or SYNC response 304. For example, SYNC request may only include internal time $t_{N_1}$ and frequency hopping velocity $v_{N_1}$. Persons of ordinary skill in the art will also recognize that although FIG. 3D shows SYNC request 302 and SYNC response 304 transmitting on frequency channel $f_3$, these is merely exemplary, and any other frequency may be used to send and/or receive SYNC request 302 and/or SYNC response 304. Furthermore, each of nodes 110 $N_1$ and/or 110 $N_2$ may hop to a different frequency while information is sent from them/to them. For example, after SYNC response 304 is sent to node 110 $N_1$, node 110 $N_2$ may hop from frequency channel $f_3$ to frequency channel $f_4$. However, the information included within SYNC response 304 will allow node 110 $N_1$ to predict where node 110 $N_2$ will most likely be at a future time so that the two nodes can hop together across various frequency channels.

Figure 4:
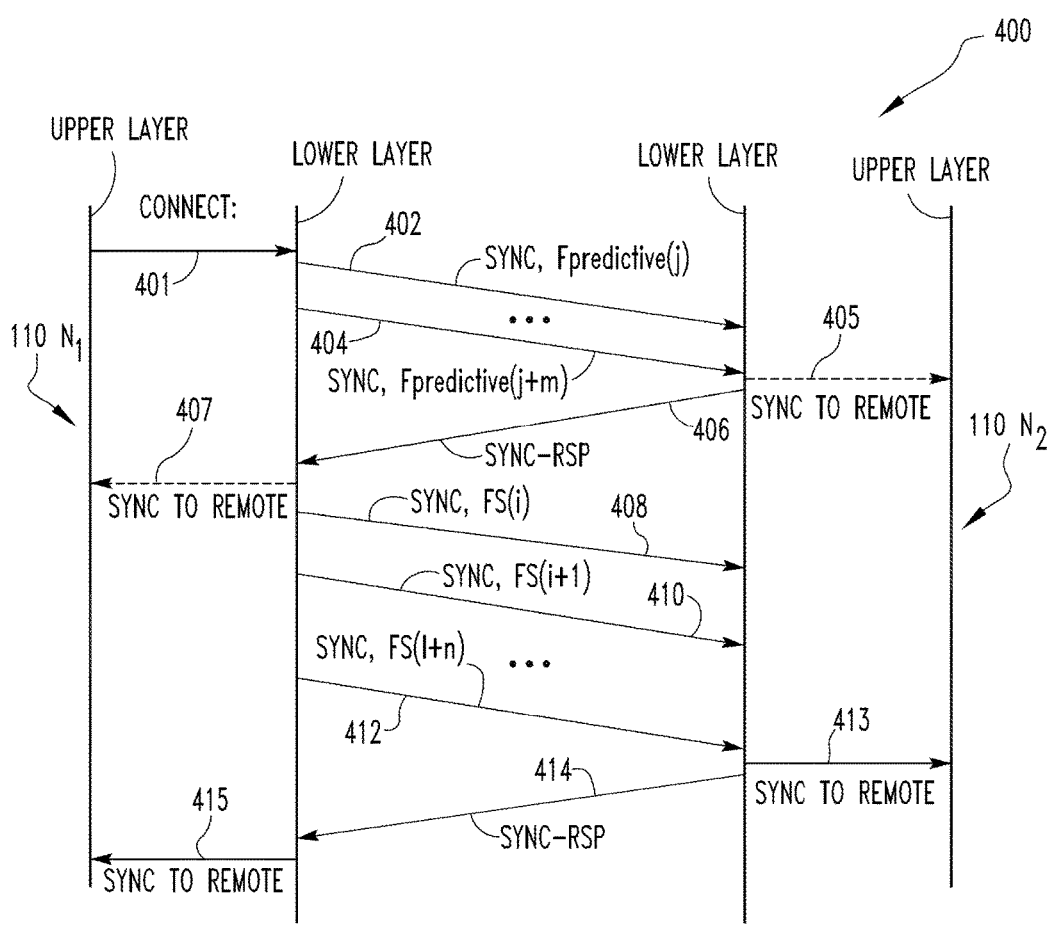
FIG. 4 is a schematic illustration of a synchronization phase for an initiating node and a target node attempting to synchronize using predictive frequency searches and/or full frequency searches in accordance with various embodiments.
Figure 5:
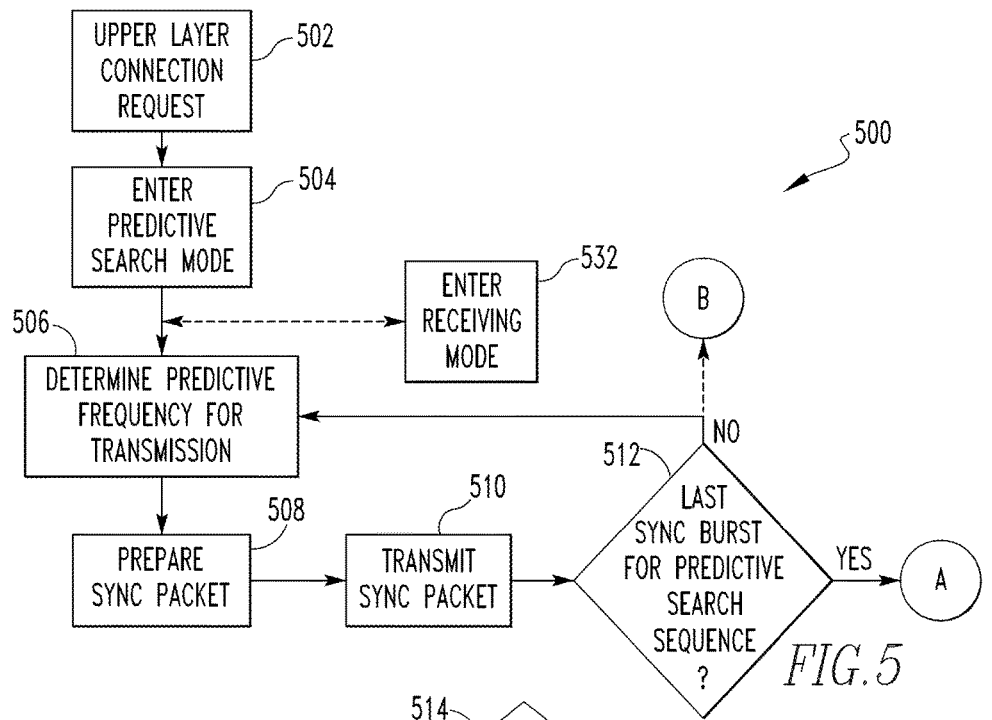
FIGS. 5-8 are illustrative flow charts of a process for synchronizing an initiating node and a target node using predictive frequency searches and full frequency searches in accordance with various embodiments.
Figure 6:
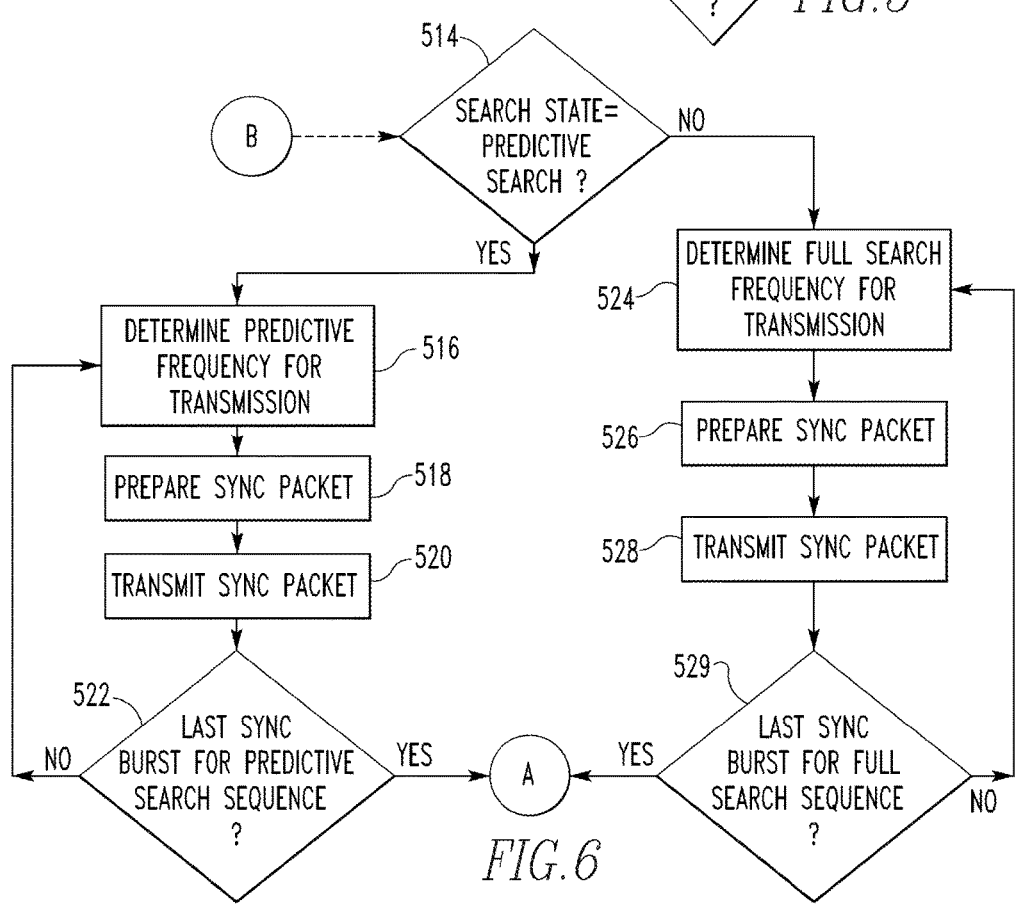

FIG. 4 is an illustrative diagram of a connection establishment synchronization phase in accordance with various embodiments. A synchronization phase 400 includes node 110 $N_1$ and node 110 $N_2$ as both a predictive search and a full search occurs. Each of nodes 110 $N_1$ and 110 $N_2$ include an upper layer and a lower layer as part of the radio link. The lower layer, in one embodiment, includes a media access layer (MAC), which maintains a link connection state machine and insures the reliable delivery of data. In a related embodiment, the lower layer, or MAC layer, provides a mechanism to insure that a link is properly authenticated and lays the basis for establishing encrypted communications before data traffic is allowed to traverse the link. The upper layer, or link layer, provides upper-layer services to the MAC layer. In one embodiment, the upper layer handles parsing and packing data into frames. In addition, the upper layer implements the connection and/or synchronization and reliable data delivery procedures. As part of carrying out this functionality, in multi-mode nodes, the link layer also determines which mode to use in communicating with a specific node, and performs the necessary operations to carry out that functionality.

In the illustrated non-limiting embodiment, node 110 $N_1$ is considered to be the initiating node, whereas node 110 $N_2$ is considered to be the targeted node, however these titles are merely exemplary and, in other embodiment, the roles may be reversed. The initiating node, or node 110 $N_1$, performs the synchronization attempt using a predictive search synchronization and, if unsuccessful, a fallback full frequency search synchronization. The goal of the predictive frequency synchronization is for the initiating node to anticipate where the target node is expected to be, and sending a SYNC request packet to the target node at the expected frequency. This is followed by attempting to send the SYNC request packet on different frequencies based on a permutation pattern to try and ensure that all frequencies have the SYNC request packet sent thereon. If the predictive synchronization attempts are unsuccessful, the initiating node will fall back to using a defined multi-frequency full search model.

For predictive searches, the initiating node will use either a default or past-exchanged, self-referenced time to derive an expected time and frequency for the target node. For example, if the initiating node and the target node have previously synchronized with one another, the previous synchronization information is used by the initiating node to derive what frequency channel the target node is expected to be on and when the target node is expected to be there. However, if there has been no previous synchronization between the initiating node and the targeting node, the initiating node may use a default seed value to begin with.

In the illustrated embodiment, initiating node 110 $N_1$ first sends a connection signal 401 from the upper layer to the lower layer. Connection request signal 401 includes all relevant information for the lower layer to send out a SYNC request such as either a default value or a seed value based on a past exchange between initiating node 110 $N_1$ and target node 110 $N_2$. The lower layer receives connection signal 401 from the upper layer and prepares the SYNC request.

The lower layer of node 110 $N_1$ will then send out a first SYNC request 402 on predicted frequency(j) to target node 110 $N_2$. Frequency(j), in one embodiment, corresponds to a frequency that node 110 $N_1$ and 110 $N_s$ previously synchronized on. Thus, frequency(j) is an initial starting frequency for the predictive frequency search. However, persons of ordinary skill in the art will recognize that this is merely exemplary, and any frequency, regardless of whether the initiating node and target node had previously synchronized, may be used.

If node 110 $N_2$ is not currently on frequency(j), initiating node 110 $N_1$ will send out a SYNC request 404 on predicted frequency(j+m). In one embodiment, predicted frequency (j+m) is the next predicted frequency in a list of predicted frequencies that target node 110 $N_2$ is expected to be on. For example, initiating node 110 $N_1$ expects target node to be on frequency(j+m) if it is not on frequency(j). As another example, after initiating node 110 $N_1$ determines that target node 110 $N_2$ is not on frequency(j), initiating node 110 $N_1$ sends out subsequent SYNC requests on various frequencies. Referring back to FIGS. 3A-C, node 110 $N_1$ first sends a SYNC request on frequency channel $f_1$. If, node 110 $N_2$ is not on frequency channel $f_1$, node 110 $N_1$ will then attempt to send a SYNC request on frequency channel $f_2$. If node 110 $N_2$ is not on frequency channel $f_2$, then node 110 $N_1$ will attempt to send the SYNC request on frequency channel $f_3$, and so on, until node 110 $N_1$ send the SYNC request on a frequency channel that node 110 $N_2$ is residing on.

In the illustrated embodiment, target node 110 $N_2$ is residing on frequency(j+m), and so when initiating node 110 $N_1$ sends SYNC request 404 on frequency(j+m), the lower layer of node 110 $N_2$ receives SYNC request 404 and communicates SYNC request 404 to the upper layer of node 110 $N_2$ via a SYNC to Remote signal 405. At a substantially same time, node 110 $N_2$ also sends a SYNC response 406 to initiating node 110 $N_1$. SYNC response 406 will, in one embodiment, include information corresponding to node 110 $N_2$ such that node 110 $N_1$ will be able to find node 110 $N_2$ at some later point such that the two nodes will be capable of frequency hopping together. For example, SYNC response 406 may communicate to node 110 $N_1$ information corresponding to an internal clock, frequency hopping velocity, and/or current frequency position for node 110 $N_2$. After SYNC response 406 has been received by the lower layer of node 110 $N_1$, a SYNC to Remote signal 407 is communicated from the lower layer of node 110 $N_1$ to the upper layer of node 110 $N_1$.

If the predictive search fails to yield a response to a synchronization request, such as SYNC response 406, synchronization phase 400 will move into a fallback full frequency search. In one embodiment, the full frequency search will begin on a default frequency value and proceed to search across the entire frequency spectrum, a portion of the frequency spectrum, or a specific frequency range (depending on the scenario). The full frequency search begins with initiating node 110 $N_1$ sending a SYNC request 408 directed at target node 110 $N_2$ on frequency(i). In one embodiment, frequency(i) is equal to frequency(j) of the predictive search in that they both may begin on the same default frequency value. However, persons of ordinary skill in the art will recognize that this is merely exemplary, and frequency(i) may be any frequency value.

If target node 110 $N_2$ is not residing on frequency(i), then initiating node 110 $N_1$ will send a second SYNC request 410 direct at target node 110 $N_2$ on frequency(i+1), where frequency(i+1) is one frequency channel greater than frequency(i) (e.g., a subsequent or next frequency). This iterative process continues, in the illustrated embodiment, until initiating node 110 $N_1$ sends out a SYNC request 412 on frequency(i+n) where target node 110 $N_2$ is currently residing. At this point, target node 110 $N_2$ receives SYNC request 412 at its lower layer and communicates the SYNC request to the upper layer of node 110 $N_2$ via SYNC to Remote signal 413. At a substantially same time, node 110 $N_2$ also sends a SYNC response 414 back to initiating node 110 $N_1$, which is communicated from the lower layer of node 110 $N_1$ to the upper layer of node 110 $N_1$ using a SYNC to Remote signal 415. In some embodiments, SYNC to Remote Signal 413, SYNC response 414, and SYNC to Remote signal 415 are substantially similar to SYNC to Remote signal 405, SYNC response 406, and SYNC to Remote signal 407, with the exception that the former correspond to a predictive frequency search and the latter correspond to a full frequency search.

In one exemplary embodiments, initiating node 110 $N_1$ will transmit a series of SYNC request packets and then listen for a response from target node 110 $N_2$ for a period of time. After the listening period passes, initiating node 110 $N_1$ will then transmit another series of SYNC request packets and then listen for a response from the target node 110 $N_2$. This process of sending multiple SYNC requests and then listening for a response is possible for both the predictive search mode and the full frequency search mode.

In still another embodiment, some or all of the SYNC request transmission may repeat. For example, initiating node 110 $N_1$ may send a first series of SYNC requests across predictive frequency(j) to predictive frequency(j+10). Initiating node 110 $N_1$ may resend SYNC requests across predictive frequency(j) to predictive frequency(j+10) after the first series, or at some later point, such as after the entire predictive frequency spectrum has been used, or after the entire full frequency search spectrum has been used. This allows for redundancy of certain frequencies that may arise due to the variability of a radio environment where a node may be on the correct frequency but the SYNC request is not correctly received. Persons of ordinary skill in the art will recognize that any number of SYNC requests may be repeated, and they may be repeated any number of times. Furthermore, persons of ordinary skill in the art will also recognize that the series of frequencies sent may be from the predictive frequency spectrum or the full frequency spectrum, or both.

FIGS. 5-8 are illustrative flow charts of a process for performing predictive frequency searches and fallback full frequency searches in accordance with various embodiments. A process 500 may begin at step 502. At step 502, an upper layer of a node makes a connection request. For example, initiating node 110 $N_1$ of FIG. 4 makes connection request 401 in an attempt to synchronize with and send data to target node 110 $N_2$.

At step 504, the initiating node, such as initiating node 110 $N_1$, enters into a predictive search mode where the initiating node attempts to find a target node, such as target node 110 $N_2$. By entering into the predictive search mode, initiating node 110 $N_1$ will attempt to intelligently predict where target node 110 $N_2$ will be within the frequency spectrum. Persons of ordinary skill in the art will recognize that initiating node 110 $N_1$ does not have to enter into a predictive search mode at this point, and instead could enter into a full search mode.

At step 506, a predicted frequency for transmitting a SYNC request packet from the initiating node to the target node is determined. In one embodiment, the predicted frequency is based on a prior synchronization that occurred between the initiating node and the target node. For example, if the initiating node and target node had previously synchronized, information corresponding to each nodes internal timing and/or frequency hopping velocity may be stored within storage (e.g., storage 114). This information may be used by the initiating node to predict where the target node will most likely be. As another example, if the initiating node and the target node have not previously synchronized with one another, the predicted frequency may be based on a default frequency value. The default frequency value may be set beforehand by the node, chosen in response to the node entering into the predictive search state, and/or chosen based on a recent synchronization with a different target node. However, persons of ordinary skill in the art will recognize that the aforementioned scenarios are merely examples, and any suitable criteria may be used to determine a predictive frequency.

At step 508, a SYNC request packet is prepared so that it may be sent from the initiating node to the target node. At step 510, the SYNC request packet is transmitted to the target node from the initiating node. The SYNC request packet is prepared such that it is transmitted to the target node on the predicted frequency determined at step 506. In one embodiment, the preparation of the SYNC request packet and the transmission of the SYNC request packet on the predicted frequency occur at a substantially same time.

At step 512, a determination is made as to whether the transmitted SYNC request packet (e.g., step 510), is the last SYNC request packet of a burst of SYNC request sent over all of the predicted frequencies in the predicted frequency spectrum. For example, if the predicted frequency is $f_1$ of FIGS. 3A-C, then there may be more frequencies in the spectrum to attempt to send SYNC request packets on, and therefore it is not the last predictive SYNC request packet to be transmitted. However, if the predicted frequency used to transmit the SYNC request packet is instead frequency $f_N$ of FIGS. 3A-C, then it may be the last frequency of the predictive frequency search.

Figure 7:
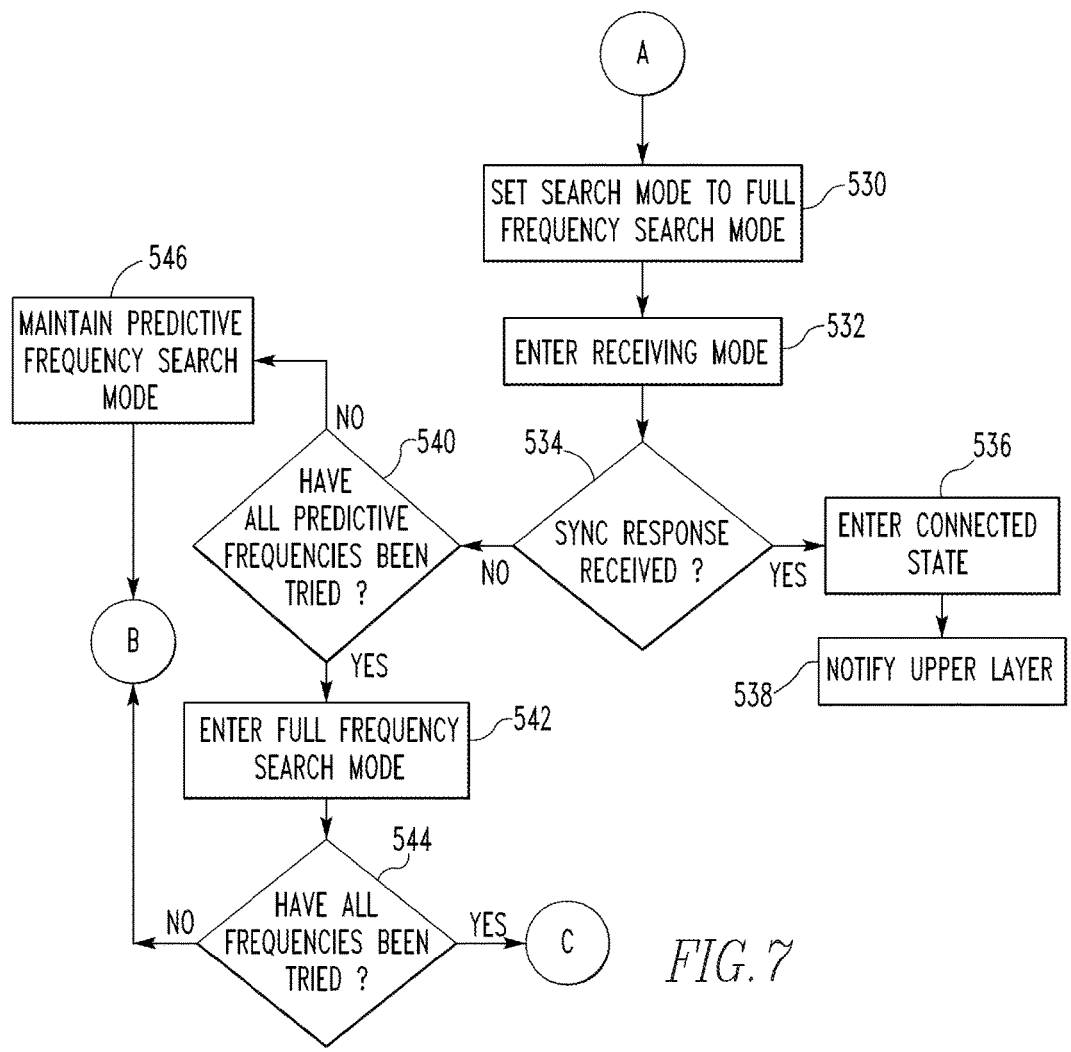
Figure 8:
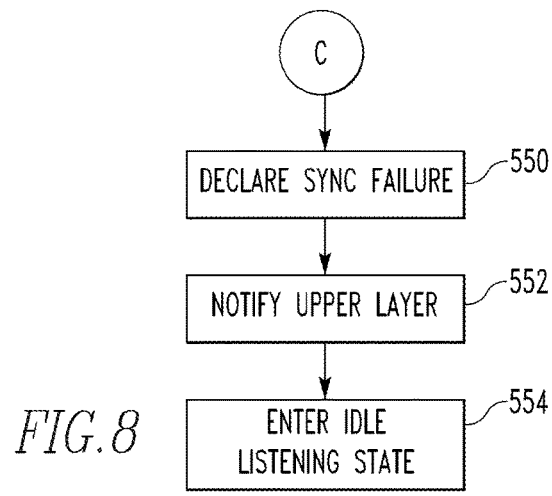

If, at step 512, it is determined that the SYNC request packet that was transmitted in the previous step (e.g., step 510) was indeed the last SYNC request packet for the current predictive search sequence, then process 500 proceeds to step 530 (see FIG. 7). At step 530, the initiating node switches from being set to predictive search mode to being set to full frequency search state mode. The switch occurs because the predictive search has already exhausted all of the predictive frequencies for sending SYNC requests on, and any additional frequencies that SYNC request packets are sent on will occur using the full frequency search mode.

At step 532, the initiating node enters into a receiving mode. In the receiving mode, the initiating node listens on a particular frequency, such as the frequency that was signaled in the SYNC request, for a response message from the targeted node based on the previously transmitted SYNC request packet. In one embodiment, the initiating node listens on a particular frequency only for a predefined period of time before deciding to continue with the synchronization attempt.

In one embodiment, step 532 occurs before step 530. For example, after the last SYNC request packet is sent, the initiating node enters into the receiving mode and listens for a response from the targeted node. In another embodiment, however, step 530 may be moved to a different portion of process 500 such that the initiating node is capable of listening for a response for each predictive frequency and then switching to the full frequency search mode. In still one more embodiment, step 530 is not required, and after the predictive search sends the last SYNC request packet, process 500 proceeds directly to step 532.

At step 534, after remaining in the receiving mode for a defined period, the initiating node determines whether a SYNC response has been received from the targeted node. For example, after initiating node 110 $N_1$ sends SYNC request 404 to target node 110 $N_2$ on predicted frequency (j+m), SYNC response 406 is sent from target node 110 $N_2$ to initiating node 110 $N_1$. In this scenario, a SYNC response (e.g., SYNC response 406) has been received by initiating node 110 $N_1$, thus process 500 will proceed from step 534 to step 536. At step 536, the initiating node enters into a connected state with the targeted node so that the two nodes can frequency hop together to communicate data. The upper layer is accordingly notified in step 538. In one embodiment, after the initiating node and the target node enter into the connected state, the initiating node and the targeted node maintain synchronization information for one another so that, at some future point, the synchronization information may be reused for predicting where each node may be.

If no SYNC response is received at step 534, process 500 proceeds to step 540. At step 540, a query is run determining whether all of the predictive frequencies have been tried. The frequencies that may be tried correspond to the predictive frequencies that may be tried individually or as a sequence set. For example, if, after SYNC request 412 is sent to target node 110 $N_2$, no SYNC response is received, then all of the frequencies have been tried because both the predictive frequencies (e.g., frequency(j) to frequency(j+m)) and the full search frequencies (e.g., frequency(i) to frequency(i+n)) have been used to transmit SYNC requests.

If, at step 540, all of the predictive frequencies have been tried, then process 500 moves to step 542 where a full frequency search state is entered. At step 544 another query is run determining whether all of the frequencies have been tried. The frequencies that may be tried correspond to the all of the available system synchronization frequencies. If all of the frequencies have been tried, a SYNC failure is declared at step 550. In response to declaring a SYNC failure at step 550, the upper layer of the initiating node is notified of the SYNC failure at step 552, and, at step 554, the initiating node enters into an idle mode listening state. In the listening state, the initiating node listens for SYNC requests from other nodes, or listens for general transmissions from other system nodes. However, the former will, as described below, typically correspond to a receiving mode for the initiating node, which in one embodiment, is substantially similar to the listening mode.

Returning back to step 512, if it is determined that the transmitted SYNC request packet of step 510 is not the last SYNC request packet of the predictive frequency search, then process 500 returns, in one embodiment, to step 506, where a next predictive frequency is determined. For example, in the illustrated embodiment, SYNC request 402 of FIG. 4 is not be the last SYNC request packet for the predictive search mode. In response, initiating node 110 $N_1$ determines the next predictive frequency to send SYNC request 404 to target node 110 $N_2$. After the next predictive frequency is determined (e.g., frequency(j+m)), another SYNC request, such as SYNC request 404, is sent to the target node. In one embodiment, this loop iterates until, at step 512, it is determined that the transmitted SYNC request of step 510 is indeed the last predictive frequency for the predictive frequency search, and process 500 then proceeds to step 530.

In one embodiment, process 500 may proceed from decision step 512 to step 514. At step 514, the initiating node determines whether or not it is in predictive search mode. For example, as shown in the illustrative embodiment of FIG. 4, SYNC request 402 is not the last SYNC request, and so process 500 may then ask whether or not the initiating node should switch from operating in the predictive frequency search mode or not. If, at step 514, the decision is to proceed in the predictive frequency search mode, process 500 proceeds to step 516 where a new predictive frequency for transmitting a SYNC request is determined. Then at steps 518, 520, and 522, the SYNC packet is prepared, transmitted to the targeted node, and a query is run to determine whether the SYNC request sent at step 520 is the last SYNC request packet for the current predictive search sequence. In some embodiments, steps 516, 518, 520, and 522 are substantially similar to steps 506, 508, 510, and 512, with the exception that the former introduces step 514 before proceeding to determine whether or not to proceed in the predictive frequency mode.

If, however, at step 514, it is determined that the initiating node is, or should not be, in the predictive frequency search mode, then process 500 proceeds to step 524. At step 524, it is determined that the initiating node is in the full frequency search mode, and a full search frequency is determined. For example, in FIG. 4, frequency(i) is determined to be a starting frequency for a full frequency search for initiating node 110 $N_1$. After the full frequency search frequency (e.g., frequency(i)) is determined, a SYNC request packet, such as SYNC request 408 is prepared at step 526, and transmitted from the initiating node 110 $N_1$ to the target node 110 $N_2$ at step 528. In one embodiment, steps 526 and 528 are substantially similar to steps 518 and 520 with the exception that the former correspond to a SYNC request using the full frequency search mode frequency and the latter correspond to a SYNC request using the predictive frequency search mode.

In response to transmitting the SYNC packet in step 528, process 500 proceeds to step 529. When in step 529, a determination is made as to whether the transmitted burst is the last for the current sequence of full search frequency bursts. In one embodiment, step 529 is substantially similar to step 522 with the exception that the former corresponds to a transmission determination using the full frequency search mode and the latter correspond to a transmission determination using the predictive frequency search mode. If, at step 529, it is determined that the transmitted SYNC request from step 528 is not the last SYNC request for the full search frequency burst, process 500 returns to step 524. However, if at step 529, it is determined that the transmitted SYNC request from step 528 is the last SYNC request for the full search frequency burst, process 500 proceeds to step 530. As described above, in steps 530 and 532, the initiating node sets the search state to full frequency search and enters into a receiving mode so that, if a SYNC response is sent from the targeted node to the initiating node, the two nodes are capable of entering into a connected state with one another (e.g., step 536). If, however, all the frequencies in the full frequency search have not been tried, then, at step 544 process 500 will proceed back to step 514. At step 514, the initiating node will again determine whether or not it should be in the predictive frequency mode or the full frequency search mode. In one embodiment, however, if the initiating node was already in the full frequency search mode, then, if a return to step 514 occurs, process 500 may proceed to step 524 as the initiating node will already know what search mode it is in. However, persons of ordinary skill in the art will recognize that the initiating node has the option to switch from being in the full frequency search mode to being in the predictive frequency search mode, or vice versa, at step 514 based on criteria beyond those presently specified.

Furthermore, at step 522, where a determination is made as to whether the transmitting SYNC request at step 520 is the last SYNC request, process 500 also proceeds to step 530. At step 530, the initiating node switch from being in the predictive frequency search mode to being in the full frequency search mode. This occurs, in one embodiment, because the initiating node has exhausted all of the predicted frequencies where the targeted node should be, and therefore enters into the full frequency search mode to send SYNC request packets out across substantially all of the suitable frequencies (e.g., frequency(i) through frequency(i+n)). However, as previously discussed, the initiating node may instead proceed directly to step 532 and enter into a receiving mode, or the initiating node may enter into the receiving mode and then set its search mode to full frequency search mode.

In one embodiment, the initiating node, at step 532, may enter into the receiving mode at an earlier point within process 500. For example, in one embodiment, the initiating node enters into the receiving mode prior to determining the predictive frequency for transmission (e.g., step 506). In this particular scenario, the initiating node is capable of continually listening for incoming transmissions from the target node and/or other nodes within ad-hoc multi-hop wireless network 100. As another example, the initiating node may enter into the receiving mode after the SYNC packet has been transmitted to the targeted node using the determined predictive frequency (e.g., step 510). In this scenario, the initiating node is capable of listening for a SYNC response to the transmitted SYNC request instead of sending out multiple SYNC requests along multiple frequencies. This way, if the first predicted frequency (e.g., SYNC request 402) is the frequency that the target node is currently residing on, then the initiating node does not have to continually send out additional SYNC requests to try and find the target node. However, this may not always be the case, and process 500 may have to send multiple SYNC request packets before a SYNC response is received. Persons of ordinary skill in the art will further recognize that the initiating node may continually be in receiving mode, and the actual point where the initiating node enters into the receiving mode is merely exemplary.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for performing a predictive frequency search in an ad-hoc multi-hop wireless networks, the method comprising:

entering into a predictive frequency search mode on an initiating node;

deriving a plurality of predicted frequencies for a target node by using synchronization information including at least both an internal time and a frequency hopping velocity received from the target node at an earlier time to predict which frequency the target node is expected to be on;

selecting, for the target node, one predicted frequency from the plurality of predicted frequencies to send a synchronization request on;

transmitting the synchronization request to the target node from the initiating node on the selected predicted frequency;

determining whether the transmitted synchronization request is a last synchronization request to be sent from the initiating node to the target node in the predictive frequency search mode; and repeating, if the transmitted synchronization request is not the last synchronization request, selecting, transmitting, and determining within a new predicted frequency from the plurality of predicted frequencies until the transmitted synchronization request is the last synchronization request.

2. The method of claim 1, further comprising:

entering, in response to determining that the transmitted synchronization request is the last synchronization request for the predictive frequency search mode, into a receiving mode for the initiating node to receive a synchronization response message from the target node.

3. The method of claim 2, further comprising:

determining whether a synchronization response message has been received by the initiating node from the target node in response to the last synchronization request being sent to the target node;

entering, if the synchronization response message has been received, into a connected state with the target node; and entering, if the synchronization response message has not been received, into a full frequency search mode.

4. The method of claim 1, wherein the synchronization request comprises at least one of: an internal time for the initiating node, a current frequency cycle position for the initiating node, and a frequency hopping velocity for the initiating node.

5. The method of claim 1, further comprising:

preparing the synchronization request prior to transmitting the synchronization request to the target node.

6. The method of claim 1, wherein determining whether the transmitted synchronization request is the last synchronization request comprises:

determining whether the predicted frequency that the synchronization request was transmitted on is a last predicted frequency from the plurality of predicted frequencies.

7. The method of claim 1, wherein the selected new predicted frequency comprises a next predicted frequency from the predicted frequency that the synchronization request was sent to the target node on.

8. The method of claim 1, wherein repeating further comprises:

selecting, continually, a new predicted frequency for the plurality of predicted frequencies to use for sending the new synchronization request to the target node.

9. The method of claim 1, further comprising:

entering into a receiving mode prior to selecting the predicted frequency.

10. The method of claim 9, wherein, when in the receiving mode, the initiating node receives a synchronization response message from the target node, the initiating node and the target node are operable to synchronize timing and frequency cycle information with one another so that the initiating node and the target node are operable to frequency hop together.

11. A method for performing a predictive frequency search in an ad-hoc multi-hop wireless networks, the method comprising:

entering into a predictive frequency search mode on an initiating node;

deriving a plurality of predicted frequencies for a target node by using synchronization information including at least both an internal time and a frequency hopping velocity received from the target node at an earlier time to predict which frequency the target node is expected to be on;

selecting, for the target node, one predicted frequency from the plurality of predicted frequencies to send a synchronization request on;

transmitting the synchronization request to the target node from the initiating node on the selected predicted frequency;

determining whether the transmitted synchronization request is a last synchronization request to be sent from the initiating node to the target node in the predictive frequency search mode, repeating, if the transmitted synchronization request is not the last synchronization request, selecting, transmitting, and determining within a new predicted frequency from the plurality of predicted frequencies until the transmitted synchronization request is the last synchronization request; and when the transmitted synchronization request is the last synchronization request packet for the predictive search mode:

entering into a full frequency search mode;

determining, using the initiating node, a frequency from a full frequency search, wherein the full frequency search includes additional frequencies not included in the plurality of predicted frequencies;

preparing a synchronization request using the frequency from the full frequency search; and sending the synchronization request using the frequency from the full frequency search to the target node from the initiating node.

12. The method of claim 11, further comprising:

entering the initiating node into a receiving mode; and determining whether a synchronization response message has been received by the initiating node from the target node in response to the synchronization request using the frequency from the full frequency search being sent to the target node.

13. The method of claim 12, further comprising:

entering, if the synchronization response message has been received, into a connected state with the target node;

sending a new synchronization request to the target node using a new frequency from the full frequency search if the synchronization response message has not been received, wherein transmitting the new synchronization request comprises, prior to transmitting:

determining the new frequency from the full frequency search; and preparing the new synchronization request using the new frequency from the full frequency search.

14. An initiating node, operating within an ad-hoc multi-hop wireless network comprising the initiating node, at least one target node, and a gateway, the initiating node comprising:

a radio operable to send and receive communications from at least one of the at least one target node and the gateway;

an interface operable to receive the communications from the radio and from a data source;

a storage operable to store at least one of the received communications and synchronization information corresponding to the at least one target node and the gateway; and at least one processor operable to:

deriving a plurality of predicted frequencies for a target node by using synchronization information including at least both an internal time and a frequency hopping velocity received from the target node at an earlier time to predict which frequency the target node is expected to be on;

send a plurality of synchronization requests to the target node on the plurality of predicted frequencies in a predictive frequency search mode;

send a plurality of synchronization requests to the target node on a plurality of full search frequencies in a full frequency search mode;

enter into a receive mode for receiving a synchronization response message from the target node in response to one of the plurality of synchronization requests sent to the target node in one of the predictive frequency search mode and the full frequency search mode being sent on a currently frequency of the target node; and synchronize, in response to receiving the synchronization response message from the target node, with the target node such that the initiating node and the target node are operable to frequency hop with one another.

\* \* \* \* \*